Feb. 16, 1932. E. KOENEMANN 1,845,289
METHOD OF AND PLANT FOR HEATING APPARATUS, ESPECIALLY SUCH
FORMING PARTS OF CHEMICAL PLANTS
Filed June 24, 1930
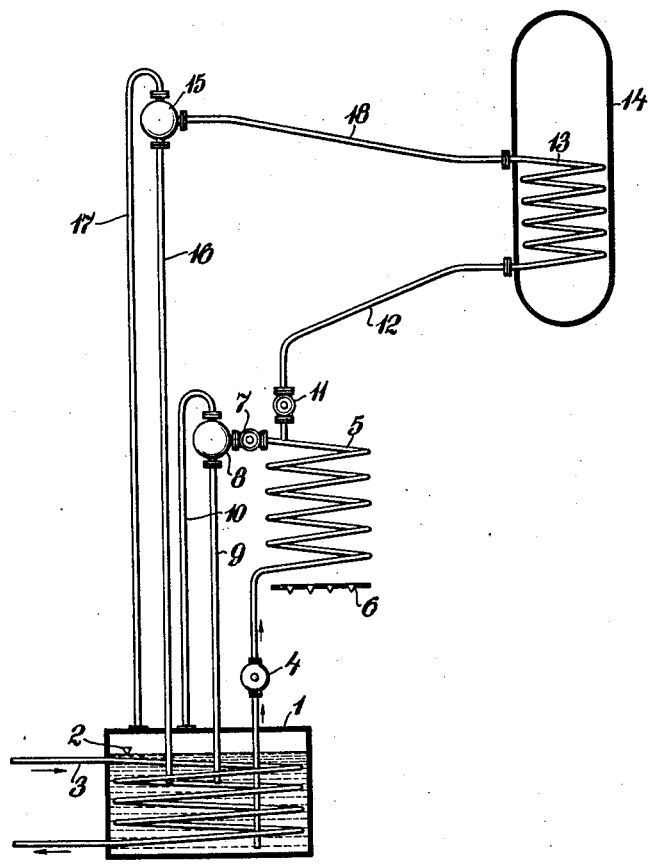
Inventor
E. Koenemann
By Marks Clerk
Attys.

Patented Feb. 16, 1932

1,845,289

UNITED STATES PATENT OFFICE

ERNST KOENEMANN, OF HALENSEE, NEAR BERLIN, GERMANY

METHOD OF AND PLANT FOR HEATING APPARATUS, ESPECIALLY SUCH FORMING PARTS OF CHEMICAL PLANTS

Application filed June 24, 1930, Serial No. 463,554, and in Germany July 1, 1929.

It is known to use for the heating of apparatus, especially such forming parts of chemical plants, a molten substance as heat-transmitting medium being solid at ordinary temperature. Operating in this way entails, however, the drawback that the substance solidifies in the apparatus and tubes concerned when the respective plant is set at rest and the whole must be heated to the requisite degree at which the substance is melted when the plant is again to be started. Owing thereto, the parts concerned are subjected to great strain which, besides, nonuniform in the several parts, and it is also possible that amounts of heat are dammed up by reason of nonuniform distribution thereof, whereby corrosions and local vaporization of the substance may be caused.

All these drawbacks are overcome, according to my present invention, by first melting the heat-transmitting medium in a separate collecting vessel or chamber whereafter the molten substance is pumped through an auxiliary circuit, a heating circuit, in which its temperature is raised to such degree that the substance cannot solidify when it is pumped through the apparatus to be heated by the intermediary of the substance. Finally, the thus far heated substance is conducted through the service circuit proper into which the respective apparatus is or are inserted.

The invention is illustrated diagrammatically and by way of example in the accompanying drawing in which I have shown a plant comprising the collecting vessel, the auxiliary heating circuit, and the service circuit mentioned in the preceding paragraph.

When the plant is at rest, the heat-transmitting agent is contained solely in a vessel, i. e. collecting vessel 1, which is filled with that substance about as high as indicated by the line or level 2. Within the vessel 1, and thus within the heat-transmitting substance, is a heating coil 3 by means of which the substance can be melted.

The substance having become liquid is then forced by a pump 4 into a coiled tube 5 which can be heated by means of a furnace 6. From the coiled tube the liquid substance passes into an auxiliary circuit composed of the already mentioned members 1, 4 and 5, and of an auxiliary or by-pass circuit proper comprising a valve 7, an air separator 8 and a tube 9 comprising a return conducting the substance from said air separator back into the vessel 1. There is, between the air separator 8 and the vessel 1, besides the tube 9, the lower end of which dips into the molten substance, another tube 10, that extends forth from the top of the air separator and terminates just at the top of the vessel 1, and the purpose of which is to equalize the pressures.

In the auxiliary circuit the substance is heated to such a temperature that it cannot solidify when it is pumped through the apparatus to be heated by the said substance. When this temperature has been reached, the valve 7 is closed and a valve 11 provided in a tube 12 connecting the coiled tube 5 with the service circuit proper, shown as comprising another coiled tube 13, is opened. When the valve 7 has been closed, the substance contained in the tube 9 flows at once down into the collecting vessel 1 from which the necessary volume of air flows into the separator 8 through the pressure equalizing or vacuum breaking tube 10.

The valve 11 being now open, the liquid substance passes into the service circuit proper shown as comprising the coiled tube 13 which is located in a service vessel or receptacle or apparatus 14 which may be of any suitable description. The other end of said tube is connected by means of a tube 18 with another air separator 15 from which extend downwardly two pipes 16 and 17, of which the first constitutes a return completing the service circuit proper and forms a part of the service circuit comprising the members 1, 4, 5, 11, 12, 13, 18, 15 and 16, and of which the other pipe 17 serves as a pressure equalizing pipe, just like the pipe 10. The circulating liquid substance is continually heated in the furnace 6 and the heat is then transmitted to the contents of the apparatus 14 by the intermediary of the coiled pipe 13. When the pump 4 is set at rest, the liquid substance will flow back into the vessel 1 partly on the way 18, 13, 12, 11, 5, 4 and partly on the way 15 and 16, so that all these members will become empty. This takes place before the substance has so much cooled down that it commences to solidify; solidification taking place only and solely in the vessel 1.

From what has been described in the preceding paragraphs it appears that the melting and the solidification of the substance used as heat-transmitting agent takes place solely in the vessel 1 which is suitably designed. A strong local superheating of the substance when being heated in order to be melted can be perfectly securely prevented by using in the coiled heating tube 3 a fluid (steam, air, a liquid) of a certain moderate, at least not unduly high, temperature so that the temperature cannot increase over a fixed point.

It is a matter of course that, besides the coiled tube 13, or the apparatus 14 respectively, also one or more other heating coils or other heat transfer apparatus or the like may be connected up to the tube 12, preferably in this way, that the several heating coils are connected in parallel so that each of the apparatus concerned can be separately operated, without disturbing, or being disturbed by, in any way the other ones.

Finally, I wish it to be understood that I do not limit myself solely to the details of the plant shown in the drawing merely by way of example. There may be departures without departing from the principle of the invention. Thus, for instance, it is possible to re-conduct the circulating heat-transmitting medium directly from the tube 16 to the pump 4 without conducting that medium first through the vessel 1 and it is also possible to insert in such a case a separate small vessel between said members 16 and 4.

I claim:

1. The method of heating apparatus, especially such forming parts of chemical plants, with the aid of a substance which is solid at ordinary temperature and adapted to act as heat-transmitting agent when it is in molten state; said method consisting in melting a body of the respective substance, driving the molten substance through an auxiliary circuit in which its temperature is increased and driving finally the liquid hot substance from and to said body through a service circuit, of which the service apparatus of the plant and liquid heating means form a part or parts.

2. A plant for heating apparatus, especially such pertaining to chemical plants, with the aid of a substance which is solid at ordinary temperature and adapted to act as heat-transmitting agent when it is in molten state, comprising, in combination with a vessel adapted to receive said substance and with melting means connected with said vessel; means for continuing the heating of the molten substance outside the said vessel; an auxiliary circuit, of which the vessel and said outer heating means form parts and which comprises, besides, conducting connections between the vessel and the said outer heating means; means for driving the molten substance through this circuit; and a service circuit connected up to the first-mentioned circuit and comprising heating means attached to the apparatus to be heated and conducting connections between the first-mentioned circuit and said latter heating means, and between these latter and the first-mentioned vessel.

3. A plant for heating apparatus, especially such forming a part or parts of chemical plants, with the aid of a substance which is solid at ordinary temperature and adapted to act as heat-transmitting agent when it is in molten state, comprising, in combination with a vessel adapted to receive said substance; melting means connected with said vessel; means for continuing the heating of the molten substance outside the said vessel; a circuit, of which the vessel and said outer heating means form parts and which comprises, besides, conducting connections between the vessel and the said outer heating means; means for driving the molten substance through this circuit; and a service circuit connected up to the first-mentioned circuit and comprising heating means attached to the apparatus to be heated and conducting connections between the first-mentioned circuit and said latter heating means, and between these latter and the first-mentioned vessel; and pressure equalizing means between this vessel and the highest point of each of said two circuits, the arrangement being such that all members empty automatically when said driving means is set at rest.

4. A plant for heating apparatus, especially such forming parts of chemical plants, with the aid of a substance which is solid at ordinary temperature and adapted to act as heat-transmitting agent when it is in molten state, comprising in combination with a vessel; melting means connected with said vessel; means for continuing the heating of the molten substance outside the said vessel; a circuit, of which the vessel and said outer heating means form parts and which comprises, besides, conducting connections between the said outer heating means and the vessel; means for driving the molten substance through this circuit; and a service circuit connected to the first-mentioned circuit and comprising heating means attached to the apparatus to be heated and conducting connections between the first-mentioned circuit and said latter heating means and between this latter and the vessel.

5. The method of heating apparatus with the aid of a substance which is solid at ordinary temperatures and adapted to act as a heat transmitting agent when it is in molten state, which comprises starting with said apparatus emptied of said heating agent, melting said substance, circulating said melted substance through an auxiliary or preliminary heating circuit until its temperature is so increased that it will not solidify on introduction to said apparatus to be heated, and thereafter circulating the preliminarily heated molten substance through the heating portion of said circuit and through said apparatus to be heated.

6. The method of conducting the operation of heating service circuits by the circulation therethrough of a heating agent which is fluid at operating temperatures but solid at ordinary temperatures which comprises, starting with said service circuits emptied of said heating agent, melting a body of said heating agent removed from said service circuits, preheating the resulting fluid heating agent to a degree sufficient to prevent solidification of the same on introduction to said service circuits, then introducing said preheated heating agent to said service circuits for initiating heating of the same, circulating said heating agent from and to said body through said service circuits and reheating the same during its circulation so long as it is desired to maintain the operation of heating, and again emptying said service circuits of said heating agent before it solidifies therein when it is desired to suspend the operation of heating.

7. The method of initiating the operation of heating service circuits by the circulation therethrough of a heat-transmitting agent which is fluid at operating temperatures but solid at ordinary temperatures which comprises, starting with said service circuits emptied of said heating agent, heating a body of said heating agent removed from said service circuits to render it fluid, preheating the resultant fluid heating agent to a degree sufficient to prevent solidification of the same on introduction to said service circuits before commencing circulation of the same therethrough, and then initiating circulation thereof from and to said body through said service circuits, thereby avoiding solidification therein.

8. The method of initiating the heating of service circuits by the circulation therethrough of a heat-transmitting agent which is fluid at operating temperatures but solid at ordinary temperatures which comprises, starting with said service circuits emptied of said heating agent, melting a body of said heating agent removed from said service circuits, initiating circulation of said melted heating agent through an auxiliary circuit while heating the same to a degree sufficient to prevent solidification of the same on introduction to said service circuits, and then transferring the circulation of said heating agent to said service circuits to be heated.

9. A plant for heating apparatus utilizing as a heat-transmitting agent a substance which is solid at ordinary temperatures but fluid at operating temperatures comprising; a chamber 1 adapted to receive said substance and provided with heating means 3 for rendering the substance fluid; an auxiliary circuit communicating with said chamber 1 to receive fluid substance therefrom and comprising heating means 5—6, a return 9 and means 4 for causing circulation of fluid substance therethrough; a service circuit comprising heating means 5—6, heat transfer or service apparatus 13—14, a return 18—16, means 4 for circulating fluid substance therethrough, and a connection for supplying fluid substance thereto; and pressure equalizing or vacuum breaking means 10—17 providing for draining of said circuits on interruption of circulation therein.

10. A plant for heating apparatus utilizing as a heat-transmitting agent a substance which is solid at ordinary temperatures but fluid at operating temperatures comprising; a chamber adapted to receive said substance and provided with heating means for rendering the substance fluid; an auxiliary circuit communicating with said chamber to receive fluid substance therefrom and comprising heating means, a return and means for causing circulation of fluid substance therethrough; a service circuit comprising heating means, heat transfer or service apparatus, a return, means for circulating fluid substance therethrough, and a connection for supplying fluid substance thereto; and means providing for draining of said circuits on interruption of circulation therein.

11. A plant for heating apparatus according to claim 10 in which the fluid in said auxiliary and service circuits is circulated by circulating means common thereto, and in which circulation in said auxiliary and service circuits, respectively, is controllable by valve means provided for the purpose.

12. A plant for heating apparatus according to claim 10 in which the fluid in said auxiliary and service circuit is heated by heating means common thereto.

13. A plant for heating apparatus according to claim 10 in which the fluid in said auxiliary and service circuits is heated by heating means common thereto, and circulated by circulating means common thereto, and in which circulation in said auxiliary and service circuits, respectively, is controllable by valve means provided for the purpose.

14. A plant of the character described comprising a chamber provided with a heating means, a second heating means; means for forcing fluid from said chamber through said second heating means; an auxiliary or by-pass circuit proper comprising an air separator, a valved inlet thereto from said second heating means and a return leading therefrom completing an auxiliary circuit through said second heating means and said fluid forcing means, pressure equalizing or vacuum breaking means communicating with said air separator; a service circuit proper comprising means for heating apparatus, a valved inlet thereto from said second heating means, an outlet therefrom to a second air separator, and a return from said second separator completing a service circuit through said second heating means and said fluid forcing means; and pressure equalizing or vacuum breaking means communicating with said second air separator.

In testimony whereof I affix my signature.

ERNST KOENEMANN.